F. J. PRIBYL.
METHOD OF DEALCOHOLIZING BEER.
APPLICATION FILED OCT. 5, 1908.
935,814.
Patented Oct. 5, 1909.
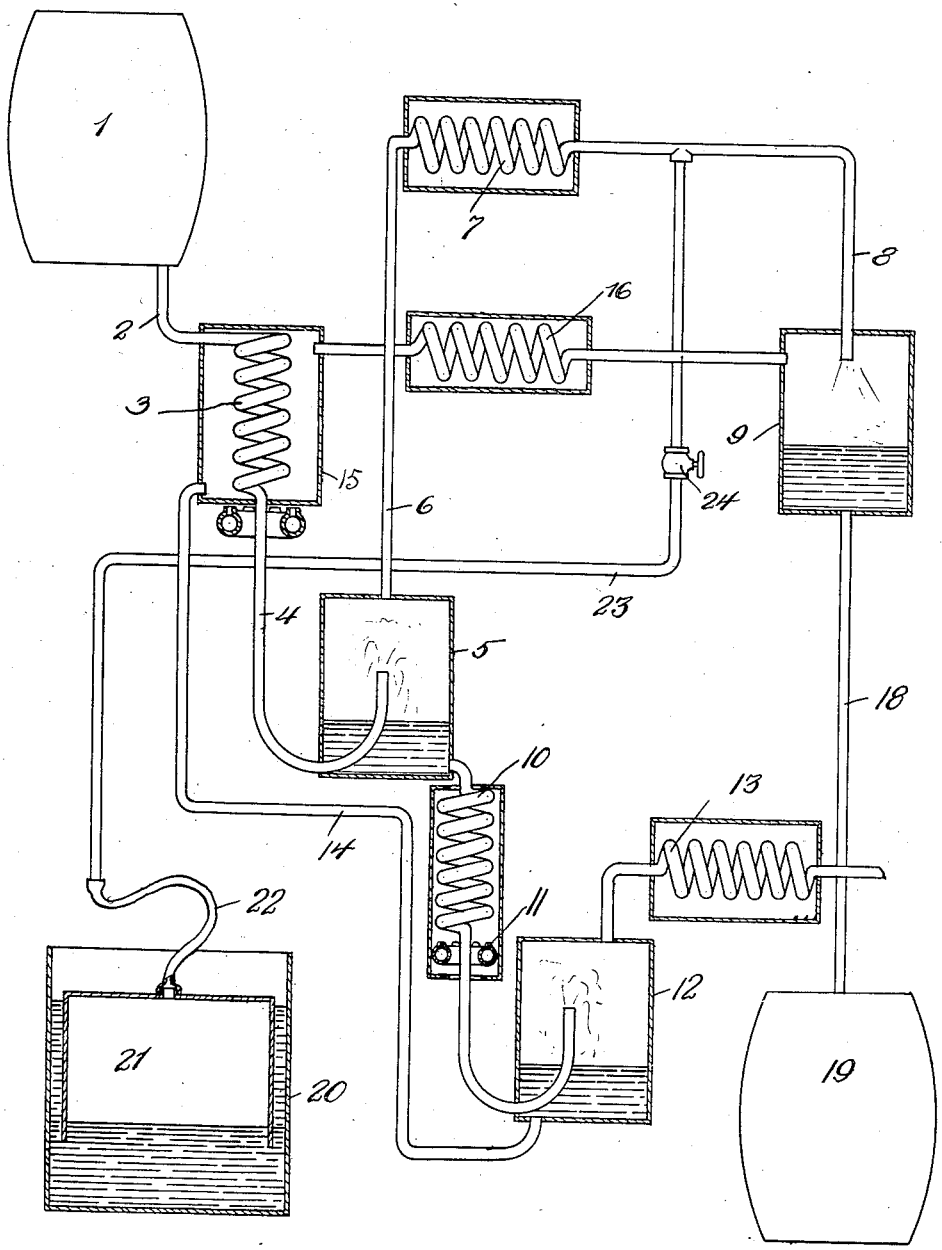
Witnesses
Inventor
F. J. Pribyl.
Attorneys

UNITED STATES PATENT OFFICE.

FRANCIS J. PRIBYL, OF UNIONTOWN, PENNSYLVANIA.

METHOD OF DEALCOHOLIZING BEER.

935,814.

Specification of Letters Patent.

Patented Oct. 5, 1909.

Application filed October 5, 1908. Serial No. 456,207.

*To all whom it may concern:*

Be it known that I, FRANCIS J. PRIBYL, a citizen of the United States of America, residing at Uniontown, in the county of Fayette and State of Pennsylvania, have invented certain new and useful Improvements in Methods of Dealcoholizing Beer, of which the following is a specification, reference being had therein to the accompanying drawing.

This invention relates to new and useful improvements in dealcoholizing beer, and the primary object of my invention is to provide a process for making a non-alcoholic beer having the same properties and ingredients as ordinary beer, with the exception that the alcohol is removed, without detriment to the beer or beverage.

Another object of my invention is to provide a process for making non-alcoholic beverages from beverages containing alcohol, the process being expeditious and highly efficient for dealcoholizing beer and similar beverages. To this end, my process extracts the alcohol from alcoholic beverages without changing the taste and color of the beverage; and I utilize the extracted alcohol for manufacturing malt whisky or denatured alcohol.

In order that my process can be fully understood, I have illustrated in the accompanying drawing a diagrammatic view of one form of an apparatus in which a process in accordance with this invention can be carried out.

In the accompanying drawings, 1 designates a vat, barrel or similar receptacle containing ordinary beer. From this receptacle the beer is conveyed through a pipe 2 to a heating coil 3 where the beer is heated to approximately 65 degrees Fahr. and from said coil by a pipe 4 into a tank 5, where the beer is sprayed, liberating carbonic-acid gas, which passes through a pipe 6 to a suitable cooling coil 7, where the gas is cooled or liquefied and passes through a pipe 8 into a tank 9. The beer from which the carbonic-acid gas has been removed passes through a coil 10 where the same is heated to 150 degrees Fahr. by a suitable burner 11. From this coil, the beer passes into a suitable tank 12 where the same is sprayed to liberate alcohol in the form of a vapor, the alcohol passing through a cooling coil 13 where the vapor is condensed. This distilled alcohol can be used for numerous purposes, particularly in making malt whisky or denatured alcohol. The dealcoholized beer contained within the tank 12 passes through a pipe 14 to a closed drum 15 surrounding the coil 3 and is then cooled further in a coil 16 to about 40 degrees Fahr. From the coil 16 the dealcoholized beer passes into the receptacle 9, where the beer is again charged with the carbonic-acid gas previously removed therefrom. The beer from the receptacle 9 can pass by gravity through a pipe 18 into a barrel 19 or similar receptacle.

In the brewing of beer, considerable carbonic-acid gas is generated, and for this purpose I provide the tank 20 having a receptacle float 21 which is connected by a flexible pipe or tube 22 to a pipe 23 connecting with the pipe 8, a valve 24 being interposed upon the pipe 23 for controlling the additional supply of carbonic-acid gas.

To economize on heat and water, I can inclose the coils in larger pipes or passages through which the beer to be treated passes to be raised to the temperature as above indicated. The distilled alcohol or malt whisky, which is a by-product of this process, can be treated as other distillates when my process is used.

It will be observed that the dealcoholized beer cannot pass by gravity to the tank 15 and coil 16, consequently a suitable pump can be used.

In lieu of using the coils previously mentioned, I can use that form of spiral coil designated 25.

By the above process I produce a beverage having substantially a taste, appearance, aroma and effervescent qualities of beer, but without the intoxicating properties.

My invention therefore comprises the following distinctive characteristics: First, heating ordinary beer to liberate only carbonic-acid gas; second, heating the decarbonated beer to approximately 150 degrees Fahr.; third, causing the decarbonated beer to be sprayed to liberate alcohol; fourth, reincorporating carbonic-acid gas into the dealcoholized beer; and fifth, utilizing carbonic-acid gas from the newly brewed beer for further charging the dealcoholized beer.

Having now described my invention what I claim as new, is:—

1. A method of dealcoholizing beer, consisting in heating beer containing carbonic-acid gas and alcohol, then spraying the heated beer to liberate the carbonic-acid gas, storing the liberated gas, then heating the decarbonated beer to a temperature of 150 degrees Fahr., then spraying the decarbonated heated beer to liberate the alcohol therefrom whereby the beer is dealcoholized, then cooling the dealcoholized beer, and then carbonating the dealcoholized beer by impregnating the same with the carbonic-acid gas which was removed therefrom.

2. A method of dealcoholizing beer, consisting in heating beer containing carbonic-acid gas and alcohol, then spraying the heated beer to liberate the carbonic-acid gas, storing the liberated gas, then heating the decarbonated beer to a temperature of 150 degrees Fahr., then spraying the decarbonated heated beer to liberate the alcohol therefrom whereby the beer is dealcoholized, then cooling the dealcoholized beer, then carbonating the dealcoholized beer by impregnating the same with the carbonic-acid gas which was removed therefrom, and then utilizing carbonic-acid gas from a newly brewed beer for further carbonating the dealcoholized beer.

3. A method for dealcoholizing an alcoholic and carbonated beverage, comprising the heating of a beverage containing alcohol and carbonic-acid gas, spraying the heated beer to liberate the carbonic-acid gas, heating the decarbonated beverage to a temperature of 150 degrees Fahr., spraying the decarbonated beverage to remove the alcohol therefrom, then cooling the dealcoholized beer, and then incorporating the carbonic-acid gas in the cooled dealcoholized beverage thereby carbonating the latter.

4. A method of manufacturing a non-alcoholic beverage from a carbonated beverage containing alcohol, comprising the heating of the beverage, then liberating the carbonic-acid gas therefrom, then heating the decarbonated beverage to a temperature of 150 degrees Fahr., then removing the alcohol from the heated decarbonated beverage by spraying the same, and then incorporating carbonic-acid gas in the dealcoholized beverage.

In testimony whereof I affix my signature in the presence of two witnesses.

FRANCIS J. PRIBYL.

Witnesses:
MAX H. SROLOVITZ,
A. J. TRIGG.